US 8,036,116 B2

(12) United States Patent
Kung et al.

(10) Patent No.: US 8,036,116 B2
(45) Date of Patent: Oct. 11, 2011

(54) VOIP NETWORK ELEMENT PERFORMANCE DETECTION FOR IP NSEP SPECIAL SERVICE

(75) Inventors: Yu-Lein Kung, Holmdel, NJ (US); Marcus L. Proctor, Westminster, CO (US); Karen Proctor, legal representative, Westminster, CO (US); Scott A. Sayers, Jackson, NJ (US); Jeffrey Stein, Cliffwood, NJ (US)

(73) Assignee: AT & T Intellectual Property I, LP, Atlanta, GA (US)

(*) Notice: Subject to any disclaimer, the term of this patent is extended or adjusted under 35 U.S.C. 154(b) by 299 days.

(21) Appl. No.: 12/342,899

(22) Filed: Dec. 23, 2008

(65) Prior Publication Data
US 2010/0097947 A1    Apr. 22, 2010

Related U.S. Application Data

(60) Provisional application No. 61/196,536, filed on Oct. 17, 2008.

(51) Int. Cl.
*G01R 31/28*    (2006.01)
*G06F 11/00*    (2006.01)
*G06F 15/173*   (2006.01)
*H04L 1/00*     (2006.01)

(52) U.S. Cl. ........ 370/230; 370/235; 370/242; 370/252; 709/224

(58) Field of Classification Search .......... 370/229–238, 370/241–252; 709/223–229
See application file for complete search history.

(56) References Cited

U.S. PATENT DOCUMENTS

| | | | |
|---|---|---|---|
| 6,633,909 B1 | 10/2003 | Barrett et al. | |
| 6,766,165 B2 * | 7/2004 | Sharma et al. | 455/423 |
| 7,006,432 B1 * | 2/2006 | Krebs et al. | 370/218 |
| 7,363,656 B2 * | 4/2008 | Weber et al. | 726/23 |
| 7,577,701 B1 * | 8/2009 | Johns et al. | 709/203 |
| 7,600,007 B1 * | 10/2009 | Lewis | 709/223 |
| 7,760,653 B2 * | 7/2010 | Poletto | 370/242 |
| 7,936,683 B2 * | 5/2011 | Qiu et al. | 370/242 |
| 2006/0285501 A1 * | 12/2006 | Damm | 370/252 |
| 2007/0168505 A1 * | 7/2007 | Devadoss et al. | 709/224 |

* cited by examiner

*Primary Examiner* — Tri H Phan
(74) *Attorney, Agent, or Firm* — Fay Kaplun & Marcin, LLP

(57) ABSTRACT

A system and method for receiving performance measurements for a communications network, generating alerts based on each performance measurement and a corresponding performance threshold, receiving network traps from network elements of the communications network, each network trap being generated by the network element based on a process measurement and a corresponding process threshold and correlating the alerts and the network traps to generate correlated alerts.

20 Claims, 2 Drawing Sheets

US 8,036,116 B2

VOIP NETWORK ELEMENT PERFORMANCE DETECTION FOR IP NSEP SPECIAL SERVICE

PRIORITY CLAIM

This application claims the benefit of U.S. Provisional Patent Application 61/196,536, filed on Oct. 17, 2008, and entitled "VoIP Network Element Performance Detection for IP NSEP Special Service," which is expressly incorporated herein, in its entirety, by reference.

BACKGROUND

Although Voice over Internet Protocol ("VoIP") technology has been in the market for several years, the Internet Protocol National Security and Emergency Preparedness (hereinafter "IP NSEP") special service management is relatively new in the network/service management arena. Because VoIP is being used for communication of information related to national security and may be used in emergency situations, it is critical that no IP NSEP calls are missed due to threats of national emergencies and disasters, and that information is provided in near real time when service degradation occurs.

SUMMARY OF THE INVENTION

A method for receiving performance measurements for a communications network, generating alerts based on each performance measurement and a corresponding performance threshold, receiving network traps from network elements of the communications network, each network trap being generated by the network element based on a process measurement and a corresponding process threshold and correlating the alerts and the network traps to generate correlated alerts.

A system having a data collection arrangement configured to receive performance measurements from a plurality of nodes of a communications network and receive network traps from the plurality of nodes of the communications network, each network trap being generated by the network node based on a process measurement and a corresponding process threshold, an alert generation arrangement configured to generate alerts based on each performance measurement and a corresponding performance threshold and a correlation arrangement configured to correlate the alerts and the network traps to generate correlated alerts.

DETAILED DESCRIPTION

Figure 1:
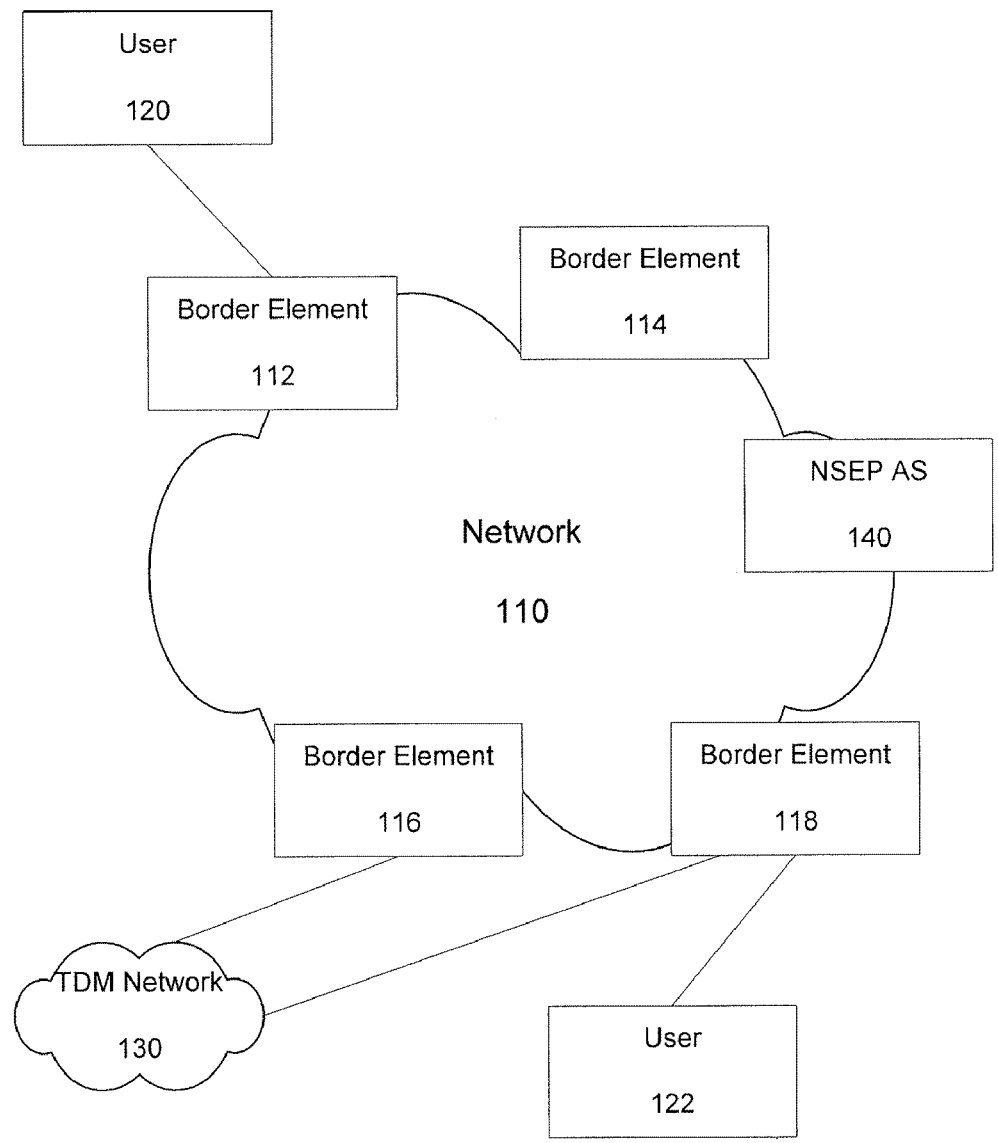
FIG. 1 shows an exemplary embodiment of a system according to the present invention.

The exemplary embodiments of the present invention may be further understood with reference to the following description and the appended drawings, wherein like elements are referred to with the same reference numerals. The exemplary embodiments describe systems and methods for providing information relating to service degradation in near real time in order to insure that no calls are missed in critical situations relating to national security.

The exemplary embodiments describe solutions whereby VoIP network element performance statistics and measurements are used for special service management. These statistics are used in near real time. Data used may include, for example actual call counts from predetermined time intervals. Special algorithms are developed and used to detect VoIP service degradation for IP NSEP. If service degradation is detected, performance alerts are generated and proactively alarmed, with proper priority and operational models in order to insure that they may be properly addressed by repair personnel.

FIG. 1 illustrates an exemplary system 100 according to the present invention. Those of skill in the art will understand that while the system 100 may be described with reference to system elements required to accomplish VoIP communications, the monitoring functions described may be equally applicable to other types of systems. The system 100 includes a communication network 110 (e.g., the Internet, an intranet, etc.), which may be used to transmit and receive various types of data, including, but not limited to, voice packets. Those of skill in the art will understand that while these elements are not shown, the system 100 may include various nodes, links between nodes, access points, service nodes, etc.

Among the components of the network 110 are border elements 112, 114, 116 and 118, by which external access to the network 110 (e.g., by users placing or receiving VoIP calls) may be accomplished. Each of the border elements may collect various performance measurement ("PM") data as required; in some exemplary embodiments, the border elements 112-118 may constantly collect a full set of measurements, while in others, PMs may be enabled and disabled selectively. Access to the network 110 may be accomplished by users 120 and 122; while the users are illustrated as accessing the network 110 directly via border elements 112 and 118 respectively, those of skill in the art will understand that access may also take place via intermediate networks.

The system 100 may also include further components for routing voice communications, such as a time division multiplexed ("TDM") network 130 and an NSEP application server ("AS") 140. For example, the voice communication that is initiated using the VoIP network may get switched to the TDM network 130 depending on the particular user that is being connected. The NSEP AS 140 is used to process those communications that are identified by a border element 112-118 as an NSEP communication. Those of skill in the art will understand that while the network 110 may include elements necessary for VoIP communications including those described as well as others not listed here, it may also serve other functions and thus may include various other elements not described.

Figure 2:
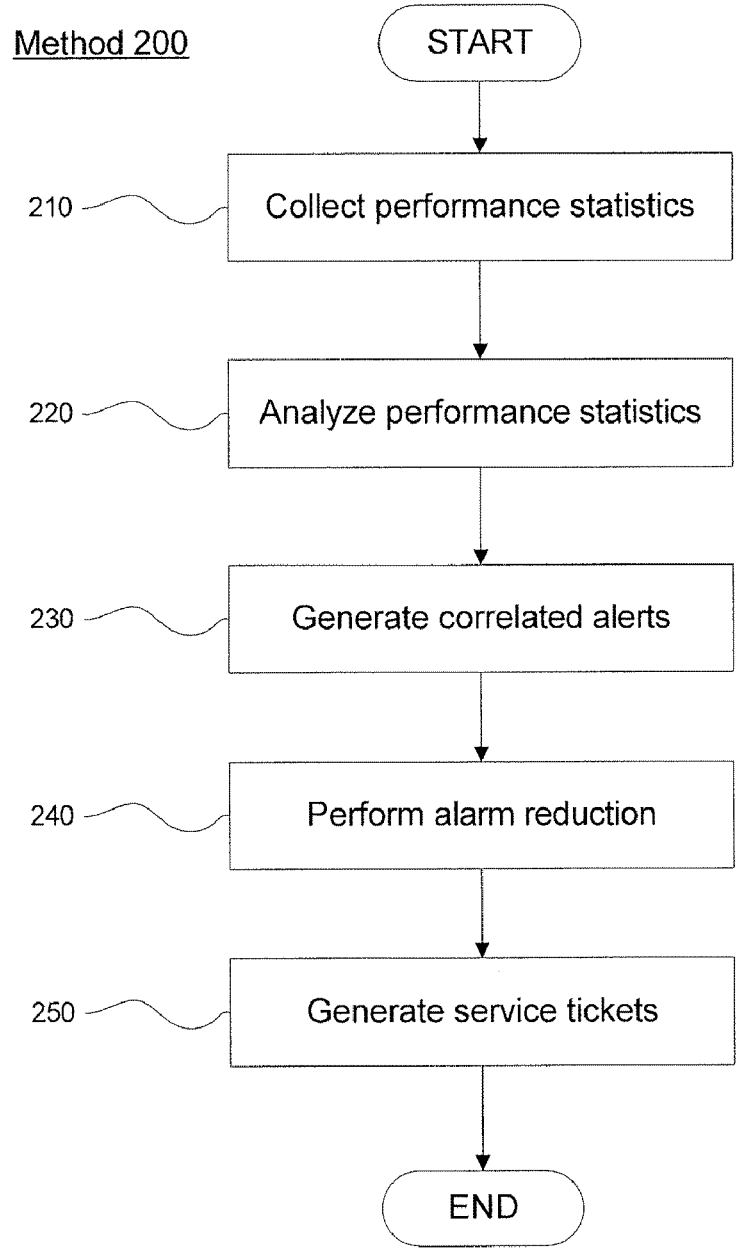
FIG. 2 shows an exemplary embodiment of a method according to the present invention.

FIG. 2 illustrates an exemplary method 200 according to the present invention. As for FIG. 1, those of skill in the art will understand that while the method 200 is described specifically with reference to VoIP communications, the same concepts may also be applied to the monitoring of various other types of data routing. In step 210, various PM data are collected. These PMs may be NSEP-specific performance statistics and measurements such as counts of high probability completion ("HPC") and resource priority header ("RPH") calls that cannot be completed. Statistics may be collected from VoIP border elements (e.g., border elements 112, 114, 116, 118) and NSEP application servers (e.g., NSEP AS 140). Collection may be at preset time intervals, or alternately may be initiated by user action.

Performance statistics used in the method 200 may thus represent aggregations of various failures over preset time intervals. In an exemplary failure mode, a user 120 of the NSEP system may dial a number to a specific government destination (e.g., the user 122). The number may be, for example, a predetermined number or may be a predetermined area code. The border element 112 that receives the user's call may recognize the call as an NSEP call and may invoke the RPH feature logic. The border element 112 then sends a session invitation protocol ("SIP") invite to the NSEP AS 140 with an RPH-specific header. If the session cannot establish a connection with the user 122, the border element 112 aggregates it as part of call statistics representing the specific RPH value corresponding to the specific nature of the session. Thus, in this exemplary manner, the border element 112 has collected a PM for this individual call that has not been completed.

As described above, the border element 112 may output these collected PMs at preset time intervals. In the example above, the PM statistic is a rejected inbound NSEP session based on the RPH value. Thus, the border element 112 may output at a preset time interval, the number of rejected inbound NSEP sessions that included this specific RPH value.

In another exemplary failure mode, the user 120 may be attempting to call a specific destination such as a Government Emergency Telecommunications Service ("GETS") Special Routing Arrangement Service ("SRAS"). Again the border element 112 may recognize this call as an NSEP call and may formulate a SIP invite including HPC information and send it to the NSEP AS 140. In this example, the end user receiving the call may be associated with the TDM network 130. Thus, the NSEP AS 140 will formulate a SIP invite and send it to an egress router (e.g., border element 116) to be routed to the TDM network 130. The border element 116 may receive a network busy signal from the TDM network 130. The border element 116 may send the network busy signal back to the NSEP AS 140 that may then attempt to route the call to a different egress router that has access to the TDM network 130 (e.g., border element 118). If border element 118 also receives a network busy signal from the TDM network 130, this signal will also be relayed back to the NSEP AS 140, which may then attempt to route the call through other egress routers that are connected to the TDM network 130. If the NSEP AS 140 determines that all the attempted egress routers return the same network busy signal, the NSEP AS 140 will indicate to the border element 112 initiating the call that the call cannot be completed. In this example, the border element 112 may keep a statistic for this call as an HPC call that cannot be connected. Correspondingly, the border elements 116 and 118 may also keep a statistic indicating that the call could not be completed. Thus, in the same manner as described above, the border elements 112, 116 and 118 (in this example) may output at a preset time interval, the number of HPC calls that cannot be connected to any route in the route list.

In step 220, a data analysis system receives the statistics from step 210 and analyzes them according to a set of rules. This may occur at a preset time interval, for example, once every five minutes. Examples of the PM statistics that may be evaluated include RPH queued and dropped communications, unsuccessful RPH session setups, inbound RPH sessions, inbound RPH rejections, HPC calls receiving "no circuit available" alerts and HPC queue overflow alerts. These factors are evaluated with respect to persistence and thresholds. That is, statistics that indicate a normal level of issues or a transient issue may be ignored. For example, since any network link may not be available 100% of the time, a normal number of calls may not be completed during any particular time interval. As long as the current statistics indicate that the number of uncompleted calls remains below this threshold, no further action may be required as the number of uncompleted calls is within the expected bounds. This threshold may be set by a user at any time or may be set automatically based on, for example, historical averages for the time of day, the day of the year, a type of event, etc. As described in one of the examples above, the border element 112 may output at a preset time interval, the number of rejected inbound NSEP sessions that included this specific RPH value. If this value exceeds the predetermined threshold, an alert may be generated.

In another example, the current statistics may indicate that the number of uncompleted calls has exceeded the threshold for a first time period, but that the next set of statistics for a subsequent second time period is below the threshold. This may indicate that the issue in the first time period is merely a transient issue that has been resolved and no further action is required. Those of skill in the art will understand that there are a number of manners of persistence processing that may be employed to determine if the statistics are indicating an actual persistent problem or a transient problem. If they reach standards of persistence and/or thresholds, a performance alert is generated.

In step 230, an alert monitoring system receives alerts such as those generated in step 220, together with network traps generated by network elements (e.g., border elements and application servers). An example of network traps in a VoIP network may be a Simple Network Management Protocol ("SNMP") trap that is generated by a network element. These network traps may indicate any problem identified by the network element. For example, in a VoIP network typical problems may include delay, jitter, packet loss, and echo. Each of the network elements may measure statistics relating to these problems and send network traps when the statistics exceed some threshold. The alert monitoring system correlates the performance-related alerts from step 220 with the process-related trap alerts generated by network elements to provide correlated alerts that may provide more detailed information than either type of alert on its own. For example, it may be determined that a particular egress router is experiencing both a performance related problem and a process related problem. This may indicate to a system administrator that this problem is a higher level or higher priority problem. The correlation of different types of alerts may provide any number of insights into potential network problems that an isolated network alert does not.

In step 240, the correlated alerts are evaluated based on a set of alarm reduction rules. These rules may examine the correlated alerts to determine whether a single problem may be represented by multiple alerts. For example, if TDM network 130 is malfunctioning, this may be indicated by alerts generated by the border element 116 in direct communication with the TDM network 130, as well as by alerts generated by network elements that have been unable to accomplish their tasks due to inability to access the malfunctioning server or other components accessed via the malfunctioning server (e.g., border element 112 in the exemplary failure described above). The alarm reduction rules thus reduce the number of alerts to a manageable quantity representing unique problems. Again, any number of rules may be evaluated based on known failure scenarios. In addition, as new scenarios are learned additional rules may be implemented to further reduce alerts to a manageable number.

Finally, in step 250, the reduced alerts are used to generate service tickets. Such tickets may be provided together with all information leading to the alerts in order to that necessary repairs and maintenance may be made. Those of skill in the art will understand that while FIG. 2 illustrates a single iteration of the steps 210 to 250, the method 210 may be performed on an ongoing basis to continually monitor the performance of a VoIP network or other communications network.

As a result of the use of the exemplary embodiments, of the present invention, service levels may be maintained near 100% efficiency. This insures that the communication requirements during national emergencies and disasters are met.

It should be noted that the exemplary method 200 may be carried out by software, hardware or a combination thereof. It should also be noted that the method may be carried out by the NSEP AS 140 or any other network device (or offline device) that receives the statistics (performance and process) from the network elements.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    receiving performance measurements for a communications network;
    generating alerts based on each performance measurement and a corresponding performance threshold;
    receiving network traps from network elements of the communications network, each network trap being generated by the network element based on a process measurement and a corresponding process threshold; and
    correlating the alerts and the network traps to generate correlated alerts.

2. The method of claim 1, further comprising:
    applying a set of rules to the correlated alerts to generate a reduced set of correlated alerts.

3. The method of claim 2, further comprising:
    generating one or more service requests based on one of the correlated alerts and the reduced set of correlated alerts.

4. The method of claim 2, wherein the set of rules generates the reduced set of alerts by eliminating duplicate alerts.

5. The method of claim 1, wherein the performance measurements are call counts.

6. The method of claim 5, wherein the call counts are counts of unsuccessful calls.

7. The method of claim 6, wherein the unsuccessful calls are one of unsuccessful high probability completion (HPC) calls, HPC queue overflow calls, unsuccessful resource priority header (RPH) calls queued and dropped, unsuccessful RPH session setups, and inbound RPH rejections.

8. The method of claim 1, wherein each performance measurement includes a predefined time interval for which data was collected.

9. The method of claim 1, wherein the generating includes:
    evaluating the performance measurements over a series of predefined time intervals to determine if one of the performance measurements persists in exceeding the performance threshold over the series of predefined time intervals.

10. The method of claim 1, wherein the performance threshold is one of set by a user and set automatically based on historical data.

11. A system comprising:
    a data collection arrangement configured to receive performance measurements from a plurality of nodes of a communications network and receive network traps from the plurality of nodes of the communications network, each network trap being generated by the network node based on a process measurement and a corresponding process threshold;
    an alert generation arrangement configured to generate alerts based on each performance measurement and a corresponding performance threshold; and
    a correlation arrangement configured to correlate the alerts and the network traps to generate correlated alerts.

12. The system of claim 11, further comprising:
    an alert reduction arrangement configured to apply a set of rules to the correlated alerts to generate a reduced set of correlated alerts.

13. The system of claim 12, further comprising:
    a service generating arrangement configured to generate one or more service requests based on one of the correlated alerts and the reduced set of correlated alerts.

14. The system of claim 12, wherein the alert reduction arrangement generates the reduced set of alerts by eliminating duplicate alerts.

15. The system of claim 11, wherein the performance measurements are call counts.

16. The system of claim 15, wherein the call counts are counts of unsuccessful calls.

17. The system of claim 16, wherein the unsuccessful calls are one of unsuccessful high probability completion (HPC) calls, HPC queue overflow calls, unsuccessful resource priority header (RPH) calls queued and dropped, unsuccessful RPH session setups, and inbound RPH rejections.

18. The system of claim 11, wherein each performance measurement includes a predefined time interval for which the performance measurement was collected.

19. The system of claim 11, wherein the alert generation arrangement is further configured to evaluate the performance measurements over a series of predefined time intervals to determine if one of the performance measurements persists in exceeding the performance threshold over the series of predefined time intervals.

20. A non-transitory computer readable storage medium including a set of instructions executable by a processor, the set of instructions being operable to:
    receive performance measurements for a communications network;
    generate alerts based on each performance measurement and a corresponding performance threshold;
    receive network traps from network elements of the communications network, each network trap being generated by the network element based on a process measurement and a corresponding process threshold; and
    correlate the alerts and the network traps to generate correlated alerts.

* * * * *